(12) United States Patent
Dziadosz

(10) Patent No.: US 8,554,865 B2
(45) Date of Patent: Oct. 8, 2013

(54) SYSTEM AND METHOD FOR REMOTELY ADMINISTERING AND SYNCHRONIZING A CLUSTERED GROUP OF ACCESS CONTROL PANELS

(75) Inventor: John A Dziadosz, Burlington, WI (US)

(73) Assignee: Honeywell International Inc., Morristown, NJ (US)

( * ) Notice: Subject to any disclaimer, the term of this patent is extended or adjusted under 35 U.S.C. 154(b) by 1023 days.

(21) Appl. No.: 11/859,031

(22) Filed: Sep. 21, 2007

(65) Prior Publication Data
US 2009/0080443 A1    Mar. 26, 2009

(51) Int. Cl.
*G06F 15/16* (2006.01)

(52) U.S. Cl.
USPC .......... 709/211; 709/209; 709/214; 709/215; 709/218; 709/221; 709/228; 709/229

(58) Field of Classification Search
USPC .................................. 709/211, 220
See application file for complete search history.

(56) References Cited

U.S. PATENT DOCUMENTS

| | | | | | |
|---|---|---|---|---|---|
| 5,001,755 | A | * | 3/1991 | Skret | 380/46 |
| 5,341,496 | A | * | 8/1994 | Middledorp et al. | 714/2 |
| 5,513,127 | A | * | 4/1996 | Gard et al. | 709/223 |
| 5,611,048 | A | * | 3/1997 | Jacobs et al. | 726/5 |
| 5,966,663 | A | * | 10/1999 | Gleason | 455/466 |
| 6,012,100 | A |   | 1/2000 | Frailong et al. | |
| 6,480,889 | B1 |   | 11/2002 | Saito et al. | |
| 6,523,696 | B1 |   | 2/2003 | Saito et al. | |
| 6,671,730 | B1 |   | 12/2003 | Akatsu et al. | |
| 2002/0035605 | A1 | * | 3/2002 | McDowell et al. | 709/206 |
| 2002/0161861 | A1 |   | 10/2002 | Greuel | |
| 2005/0015471 | A1 | * | 1/2005 | Zhang et al. | 709/221 |
| 2005/0135389 | A1 | * | 6/2005 | Hurtta | 370/401 |
| 2006/0074940 | A1 | * | 4/2006 | Craft et al. | 707/100 |
| 2007/0043954 | A1 | * | 2/2007 | Fox | 713/185 |

OTHER PUBLICATIONS

European Search Report corresponding to European Application No. EP 08 16 4752, dated Dec. 11, 2008.
Francisco Macia-Perez et al.: Network Service Providing by means of Embedded Systems, Industrial Informatics, 2006 IEEE; International Conference on IEEE, PI, Aug. 1, 2006, pp. 624-629, XP031003424; ISBN: 978-0-7803-9700-2.

* cited by examiner

*Primary Examiner* — Jude Jean Gilles
*Assistant Examiner* — Jaren M Means
(74) *Attorney, Agent, or Firm* — Husch Blackwell LLP

(57) ABSTRACT

The present invention advantageously provides a system and method for remotely administering and synchronizing a clustered group of access control nodes using a gateway node. A device, such as a network browser, submits an update for one node of the cluster of nodes to a web server in the gateway node. The web server transmits, via a communication interface in the gateway node, the submitted update to the node configuration database of the appropriate node while the gateway updates its configuration database in accordance with the submitted update. In another embodiment, the device is a dedicated host computer. The data can be transmitted in accordance with a binary access protocol.

11 Claims, 5 Drawing Sheets

SYSTEM AND METHOD FOR REMOTELY ADMINISTERING AND SYNCHRONIZING A CLUSTERED GROUP OF ACCESS CONTROL PANELS

FIELD OF THE INVENTION

This invention relates generally to security systems having access control panels. In particular, this invention relates to a system and method for remotely administering and synchronizing a single or a clustered group of access control panels.

BACKGROUND OF THE INVENTION

Access control systems provide security to homes and businesses by controlling access to a facility and preventing unwanted intrusions. Generally, an access control system has both hardware and software that are integrated to provide security technologies. Most systems contain access control panels that combine with software to control access, identify users, and detect intruders. Typical access control systems may be administered by a dedicated host computer, and may utilize software and data available on the host computer through a networked web service interface. When multiple access control nodes or panels are configured through the web service, each access control node or panel must be individually installed, configured and administered. Often much of the data is common among nodes on a clustered group of access control systems, and it is desirable to treat this information as a single object that is shared and simultaneously updated on each node of the clustered access control group.

Among the problems of the aforementioned systems is that to enable installation, maintenance, and updating of multiple access control nodes, a dedicated host computer must maintain all of the data and download appropriate data to the nodes as needed, and that duplicate access control data must reside on each node.

SUMMARY OF THE INVENTION

The present invention enables a clustered set of access control nodes to be established, administered, and monitored as a group. Configuration data common to all of the access control nodes in the cluster is stored in a configuration database and administered as an individual object. The configuration database is partitioned into two database objects, a global database object which comprises the data which is common to all nodes in the cluster, and a node specific configuration database which contains configuration data specific to the node. Synchronization of the cluster is performed by a gateway node, associated with the cluster, using a Binary Access Control protocol.

The present invention advantageously provides a system and method for remotely administering and synchronizing a clustered group of access control nodes using a gateway node. A device, such as a network browser, submits an update for one node of the cluster of nodes to a web server in the gateway node. The web server transmits, via a communication interface in the gateway node, the submitted update to the node configuration database of the appropriate node while the gateway updates its configuration database in accordance with the submitted update. In another embodiment, the device is a dedicated host computer. The data can be transmitted in accordance with a binary access protocol.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DETAILED DESCRIPTION OF THE INVENTION

An inventive solution is presented to the need for a system and method that enables information common among a cluster of access control nodes to be treated as a single object that can be shared and simultaneously updated.

Figure 1:
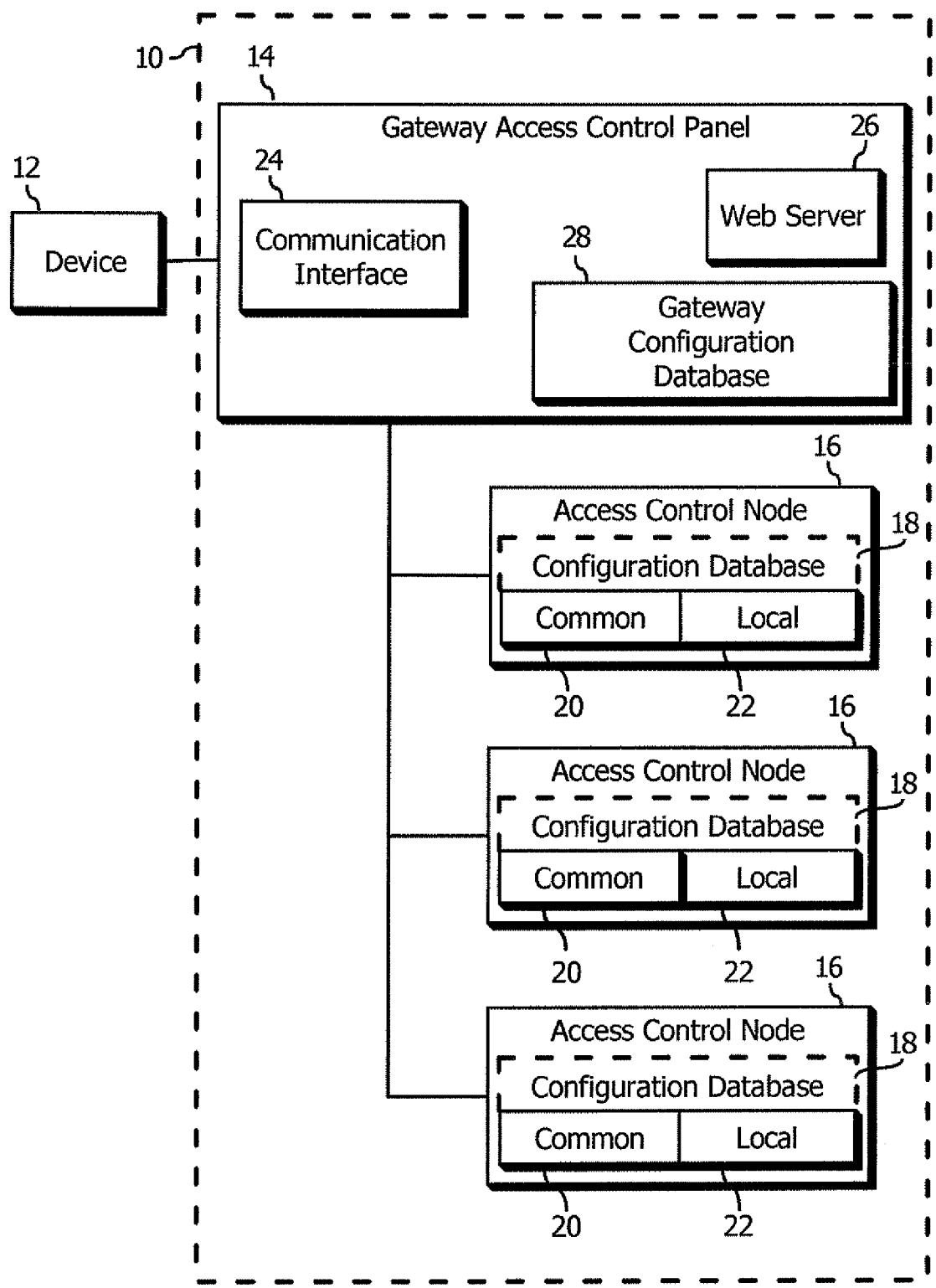
FIG. 1 is a block diagram of an exemplary embodiment of the present invention.

FIG. 1 shows an Access Control Cluster 10 according to the present invention. In this embodiment, a device 12, e.g. a network enabled browser device, provides the human interface to the Cluster 10. It is also possible for the device 12 to be a dedicated host. The network enabled browser device 12 is any device that provides a network browser with standard internet communication protocols, typically a personal computer with an industry standard internet browser, such as Internet Explorer or Firefox, capable of accessing a Gateway Access Control Point 14. Other devices containing necessary standard internet protocols, including but not limited to cellular telephones, PDAs, laptop computers, and computer workstations, may also be used as network enabled browser devices 12.

An Access Control Cluster 10 is comprised of a Gateway Access Control Point 14 and one or more downstream or remote Access Control Nodes 16. Since the Gateway Access Control Point 14 may contain embedded access control node functionality, a configuration with a standalone Gateway Access Control Node 14 with embedded access control logic is considered to be a cluster of one Access Control Node.

The Gateway Access Control Node 14 provides the interface between the user and the Access Control Cluster 10. The user operates the network enabled browser device 12 and accesses the Gateway Access Control Node 14 which provides the ability to update, install, modify and/or retrieve the database and control logic of any Access Control Node 16 within the Access Control Cluster 10.

An Access Control Node 16 is defined as a device capable of receiving and processing an access request, and granting or denying access based on the request. The Access Control Node 16 also detects change of state on input devices and allows for the pulsing or activation of output relay devices based on various conditions. For example, a typical application involves the activation of an output relay, e.g., opening a door, when a valid access card credential is presented to a card reader attached to the Access Control Node 16.

The Configuration Database 18 contains all the configuration data needed by the Access Control Node 16 to perform the intended access control functions. The Database 18 is partitioned into two entities, a Common object 20 and a Node Specific object 22. The Common object 20 contains information that is common to all control nodes in the Access Control Cluster 10. An example of such information would include dates of holidays, time zone access periods, geographic time zone, credential (cardholder) information, card credential formats, and access levels, among other data.

The Node Specific or Local object 22 contains information local or specific to an individual Access Control Node 16. An example of such information would be specific devices, e.g. credential readers or other I/O devices, that are attached to the Access Control Node 16, access levels assigned to specific devices, specific configuration of Input and Output devices, and a list of supported card formats per credential reader device, among other information.

Each Control Node 16 has a configuration database 18 that has the data common to all Access Control Nodes 16 in the cluster 10 as well as local (node-specific) data for each node in the cluster 10. The Gateway 14 provides access to the configuration database on each Access Control Node 16. In the embodiment shown in FIG. 1, the Gateway 14 contains an optional configuration database 28 with the data common to all nodes 16 in the cluster 10.

The Gateway 14 also includes a web server 26 and a Communications Interface 24 that allows the web server 26 to disseminate information to each individual Access Control Node 16. The Communications Interface 24 implements a message based communication protocol, e.g., Binary Access Protocol, to facilitate communication between the Gateway 14 and the downstream Access Control Nodes 16. Binary Access Protocol is described in more detail below.

Figure 2:
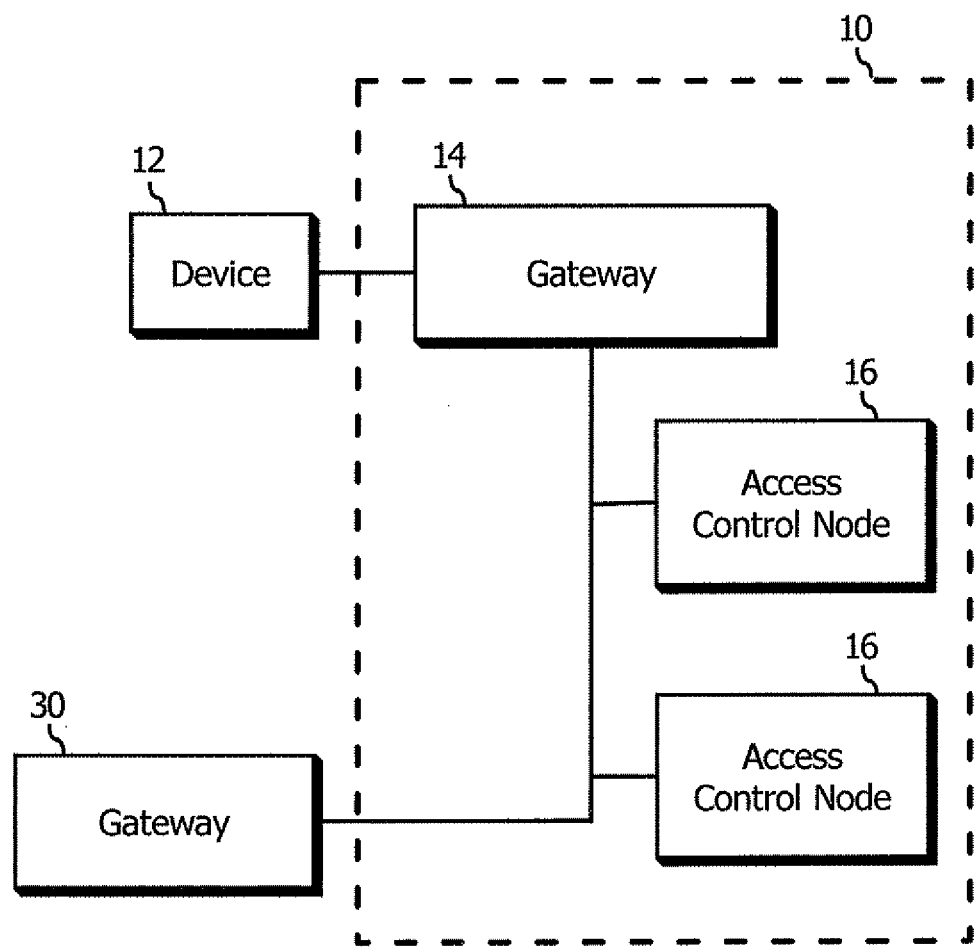
FIG. 2 is a block diagram of a second embodiment of the present invention.

The architecture of the Access Control Cluster 10 is not limited to any particular network or media type. Network and/or media may include, but are not limited to, serial communications (RS-232, RS485), LAN connections such as Ethernet, general internet connections, intranet connections, and wireless communications, e.g., cellular, Zigbee. As shown in FIG. 2, the architecture allows multiple Gateway Access Control Nodes or gateway controllers 16, 30 to access the Cluster 10. A backup/secondary gateway controller 30 can provide access in the event that the primary gateway controller 16 is off line.

Configurations with multiple peer gateway controllers are also possible, whereby simultaneous access to the cluster data in the Configuration Databases 18 for each Node 16 is coordinated by these peer gateway controllers.

Figure 3:
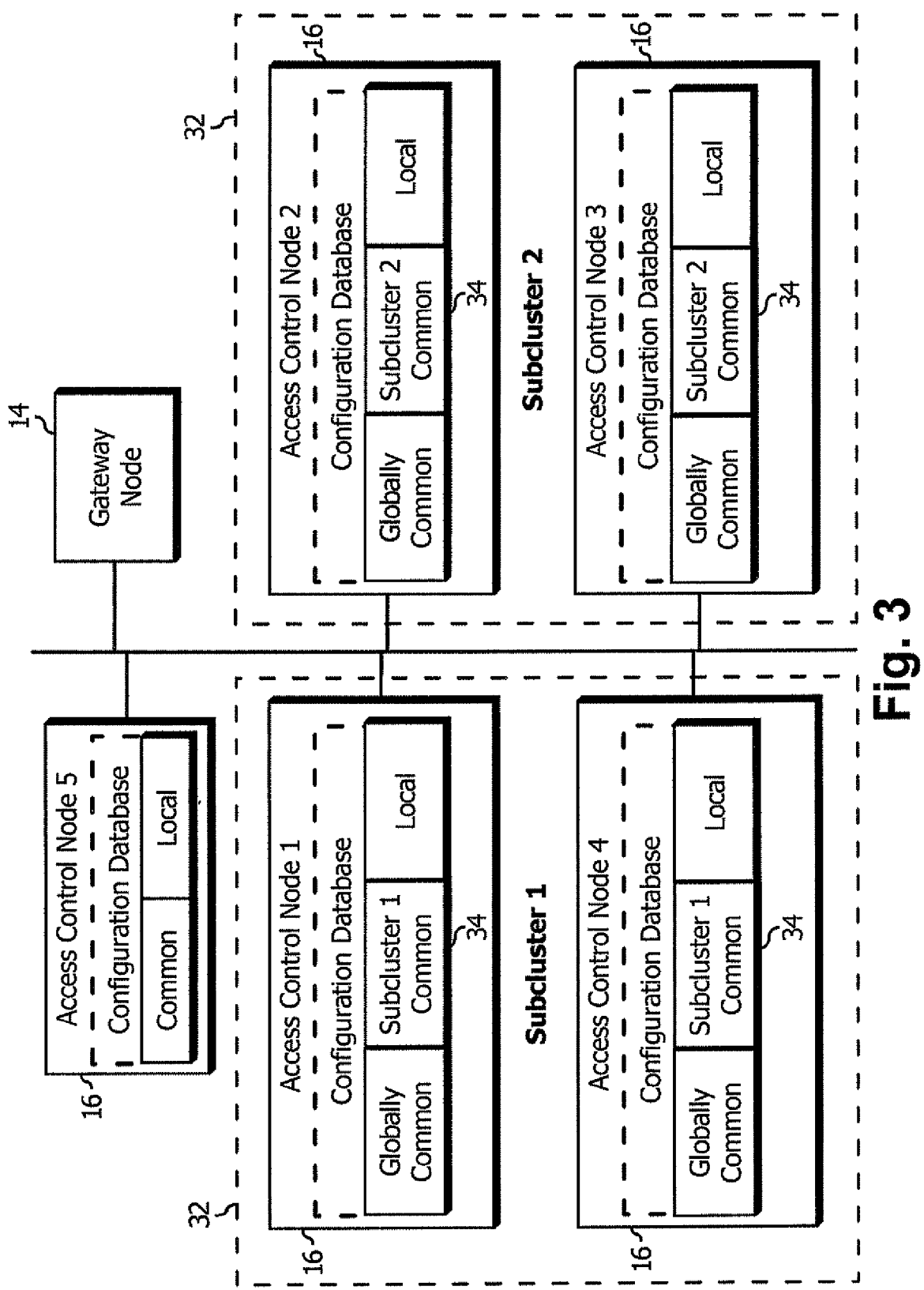
FIG. 3 is a block diagram of a third embodiment of the present invention.

In one embodiment, a group of Access Control Nodes 16 in the Access Control Cluster 10 may be partitioned in sub-clusters 32, as shown in FIG. 3. When sub-clustering is used, Access Control Nodes 16 are assigned to a sub-cluster 32. A Common object 20 may be designated as cluster wide or defined uniquely for a sub-cluster. Sub-clustering allows for data to be shared as Common object 20 among all cluster members, and also allows for variations in data between sub-cluster objects 34 and common to only a subset of gateways or controllers 14 within the main Access Control Cluster 10.

Binary Access Protocol provides the web server 26 of the Gateway Access Control Panel 14 with the ability to manage and control the panels or Access Control Nodes 16, including functions such as system configuration data management, panel system control and application upgrades. Binary Access Protocol is an asymmetric Command/Response protocol in which all commands are initiated by a host or web server running on the Gateway Access Control Panel 14. The Protocol supports both traditional commands and a new set of "binary" commands. Fields in the protocol message that are multi-byte integers are stored in big Endian format, that is, with the most significant byte first and the least significant byte last. Protocol header information, which is counted in the message size, includes the source of the message, the destination, i.e. node or panel, for the message, the message type, version, unique sequence number, most and least significant byte of message data length, message data and an end of message indicator. At least four message types are supported, including database commands, system commands, image management commands, and event management commands.

Figure 4:
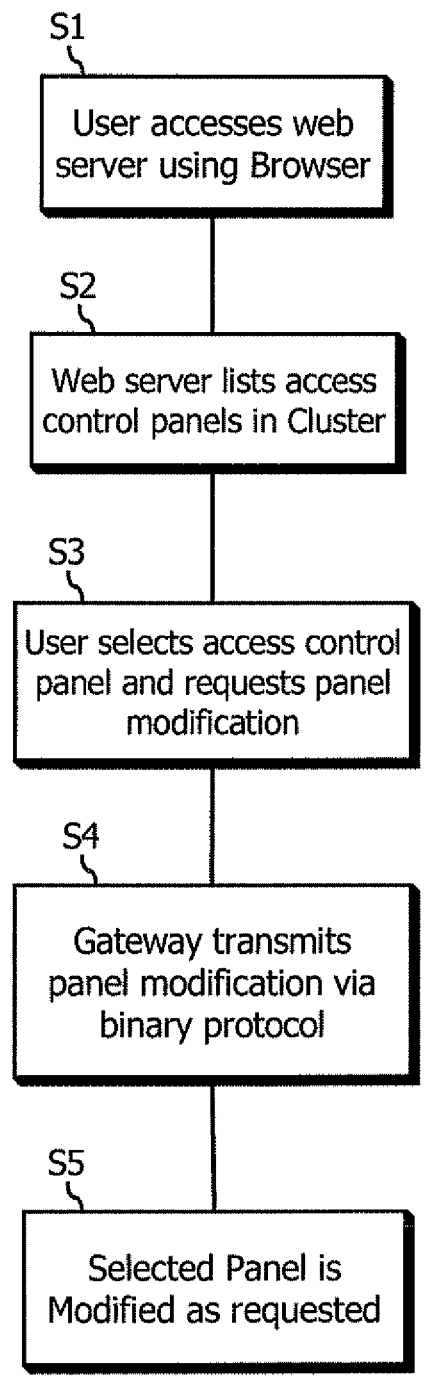
FIG. 4 is a flow diagram illustrating the steps for an exemplary embodiment of the present invention.

FIG. 4 illustrates the steps in an exemplary embodiment of the inventive system shown in FIG. 1. In Step S1, a user accesses the web server 26 in the Gateway Access Control Point 14 using a network enabled browser device 12. The web server 26 presents a list of panels or Access Control Nodes 16 available to the user from the Gateway 14 in Step S2. The user, in step S3, then either selects a Node 16 from the list and requests modification of the selected node 16, or indicates that a new node 16 is to be added. In step S4, the Gateway 14 transmits the node creation or modification information to the selected node 16 using Binary Access Protocol. Finally, in step S5, the selected node 16 is modified, or the new node 16 is established, in accordance with the user's request. New nodes are self-initialized and ready for service when powered up; typically, each new node contains a minimal configuration database with factory default settings. When a node 16 is connected to a cluster 10 containing a Gateway 14, it may be configured to automatically detect and synchronize or update the common database of the new node's configuration database 18. If the Gateway 14 is not configured to automatically detect and update the new node 16, it can be updated by manually requesting synchronization from the Gateway 14.

Figure 5:
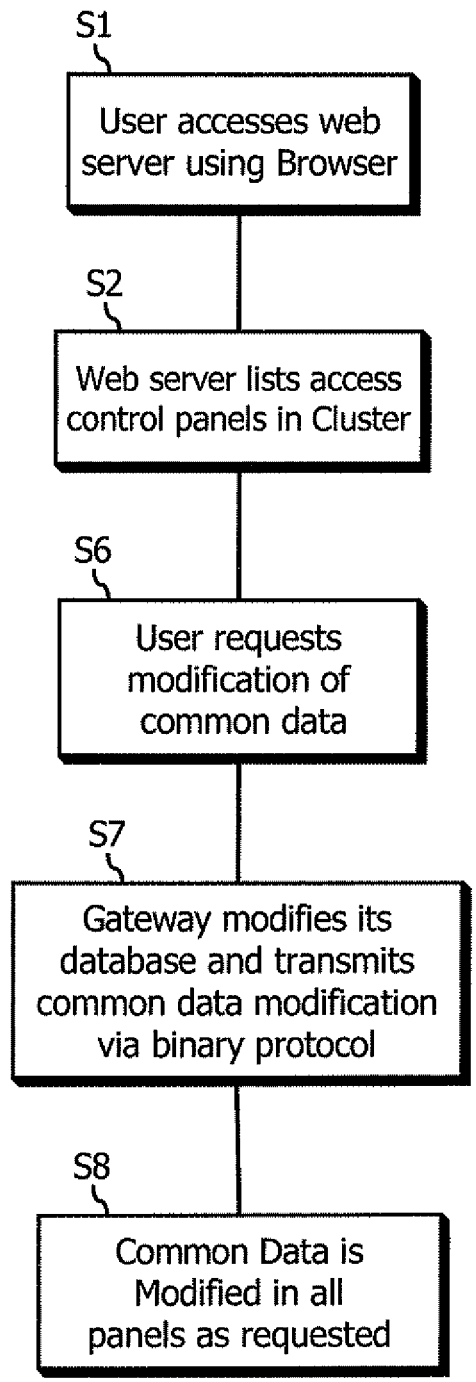
FIG. 5 is a flow diagram illustrating the steps for another embodiment of the present invention.

FIG. 5 illustrates the steps in another embodiment of the inventive system shown in FIG. 1. As above, in Step St, a user accesses the web server 26 in the Gateway Access Control Point 14 using a network enabled browser device 12, and the web server 26 presents a list of Access Control Nodes 16 available to the user from the Gateway 14 in Step S2. In step S6 of this embodiment, the user requests modification of the data common to all nodes 16 in the Cluster 10. In step S7, the Gateway 14 simultaneously updates all Common data 20 in each Access Control Node 16 configuration database 18 and also updates the Local data 22 of the node(s) selected in S3. As above, the transmission of the modification to the nodes 16 is done using Binary Access Protocol. Finally, in step S8, the Common object 20 of the configuration databases 18 in all nodes 16 is modified or updated in accordance with the user's request. Also in S8, the Local data 22 of the nodes selected in S3 are update in accordance with the user's request.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system comprising:
   a device providing a human interface to a user;
   a plurality of remotely located access control panels of a security system;
   a respective card reader attached to each of at least some of the plurality of control panels;
   control logic of each of the plurality of remotely located access control panels, each panel of the plurality of remotely located access control panels defines a device that receives and processes an access request from the respective card reader and grants or denies access to a home or business by at least opening a door based upon the request, the card reader and panel opening the door when a valid access card credential is presented to the card reader;

each panel of the plurality of remotely located access panels has panel configuration database that contains all of the configuration data needed by the access control panel to perform the intended access control functions of the panel, the panel configuration database has a common object and a local object, wherein the common object defines configuration data for access control that is common to all of the panels and the local object defines configuration data for access control that is local to the panel; wherein a format of cards read by the respective card reader defines at least some of the configuration data of the common object of the plurality of remotely located access control panels and a configuration of the respective card reader defines at least some of the configuration data of the local object of the at least some remotely located access control panels; and one of the plurality of remotely located access control panels providing a gateway to at least one other of the plurality of remotely located access control panels, the gateway comprising:
a communications interface;
a web server; and
a gateway configuration database; wherein said device that provides the human interface receives an update to the common object of the plurality of access control panels from the user and submits the update to said web server, said gateway updates said gateway configuration database using said submitted update and said web server transmits said submitted update to the panel configuration database of each of the plurality of access control panels, said transmission, at least in part, using said communications interface.

2. The system according to claim 1, wherein said transmission is in binary access protocol format.

3. The system according to claim 1, wherein said device is one of a browser and a host.

4. A system comprising
a device providing a human interface for a user;
a plurality of remotely located access control panels of a security system;
a respective card reader attached to each of the plurality of remotely located access control panels;
control logic of each of the plurality of remotely located access control panels, each panel of the plurality of remotely located access control panels defines a device that receives and processes an access request from the respective card reader and grants or denies access to a home or business by at least opening a door based upon the request, the card reader and panel opening the door when a valid access card credential is presented to the card reader;
each access control panel of the plurality of remotely located access control panels has a panel configuration database that contains all of the configuration data needed by the access control panel to perform the intended access control functions of the panel, the panel configuration database having a common object and a local object, wherein the common object defines configuration data for access control that is common to all of the access control panels and the local object defines configuration data for access control that is local to the access control panel, wherein a format of cards read by the card reader defines at least some of the configuration data of the common object of the plurality of remotely located access control panels and a configuration of the respective card reader defines at least some of the configuration data of the local object of the at least some remotely located access control panels; and one of the plurality of remotely located access control panels providing a gateway comprising:
a communications interface;
a web server; and
a gateway configuration database having said common object;
wherein said device providing the human interface receives an update to the common object of at least one other panel of the plurality of remotely located access control panels through the human interface from the user and submits the update for said common object, said gateway updates said common object in said gateway configuration database using said submitted update and said web server transmits said submitted update to said common object of said panel configuration database of the at least one other panel, said transmission, at least in part, using said communications interface.

5. The system according to claim 4, wherein said transmission is in binary access protocol format.

6. The system according to claim 4, wherein said device is one of a browser and a host.

7. A system comprising:
a device providing a human interface for a user;
a plurality of remotely located access control panels of a security system;
a respective card reader attached to each of at least some of the plurality of remotely located access control panels;
control logic of each of the plurality of remotely located access control panels, each panel of the plurality of remotely located access control panel defines a device that receives and processes an access request from the respective card reader and grants or denies access to a home or business by at least opening a door based upon the request, the card reader and panel opening the door when a valid access card credential is presented to the card reader;

each access control panel of the plurality of remotely located access control panels has a panel configuration database that contains all of the configuration data needed by the access control panel to perform the intended access control functions of the panel, the panel has a common object and a local object, wherein the common object defines configuration data for access control that is common to all of the access control panels and the local object defines configuration data for access control that is local to the access control panel,
wherein a format of cards read by the card reader defines at least some of the configuration data of the common object of the plurality of remotely located access control nodes and a configuration of the respective card reader defines at least some of the configuration data of the local object of the at least some remotely located access control nodes; and
a gateway comprising:
a communications interface;
a web server; and
a gateway configuration database;
wherein said device receives a request to create an access control panel through the human interface from the user and submits the request to said web server, said gateway updates said gateway configuration database creating said access control panel and said web server creates a access control panel configuration database within said requested access control panel.

8. A method for administering and synchronizing a clustered group of remotely located access control panels of a security system, said method comprising:

defining each access control panel of the clustered group of remotely located access control panels of the security system as a device that receives and processes an access request and grants or denies access to a home or business based upon the request;

storing configuration data common to all of the clustered group of remotely located access control panels in a database of each panel of the clustered group of remotely located access control panels and administering the configuration data as a common object where the stored configuration data of the database contains all of the configuration data needed by the access control panel to perform the intended access control functions;

a respective card reader attached to each of at least some of the plurality of remotely located access control panels, the card reader and access control panel opening a door when a valid access card credential is presented to the card reader, wherein a format of cards read by the card reader defines at least some of the configuration data of the common object of the plurality of remotely located access control panels and a configuration of the respective card reader defines at least some of the configuration data of the local object of the at least some of the remotely located access control panels;

providing a human interface to the clustered group of remotely located access control panels of the security system that receives an access control update from a user;

submitting the access control update from the user through the human interface to a gateway for updating the configuration database of a access control panel having a local object of the configuration database, said gateway having a configuration database;

transmitting said submitted access control update to said access control panel; and updating said local object of said configuration database of said access control panel.

9. The method according to claim 8, wherein said update for said node is submitted from one of a host and a browser.

10. The method according to claim 8, wherein said transmitting is in binary access protocol format.

11. The method according to claim 8, wherein said gateway further comprises a web server for transmitting said update for said node.

* * * * *